F. E. SCHWENTLER.
MANUALLY OPERATED SLACK ADJUSTER.
APPLICATION FILED SEPT. 30, 1916.
1,328,341.
Patented Jan. 20, 1920.
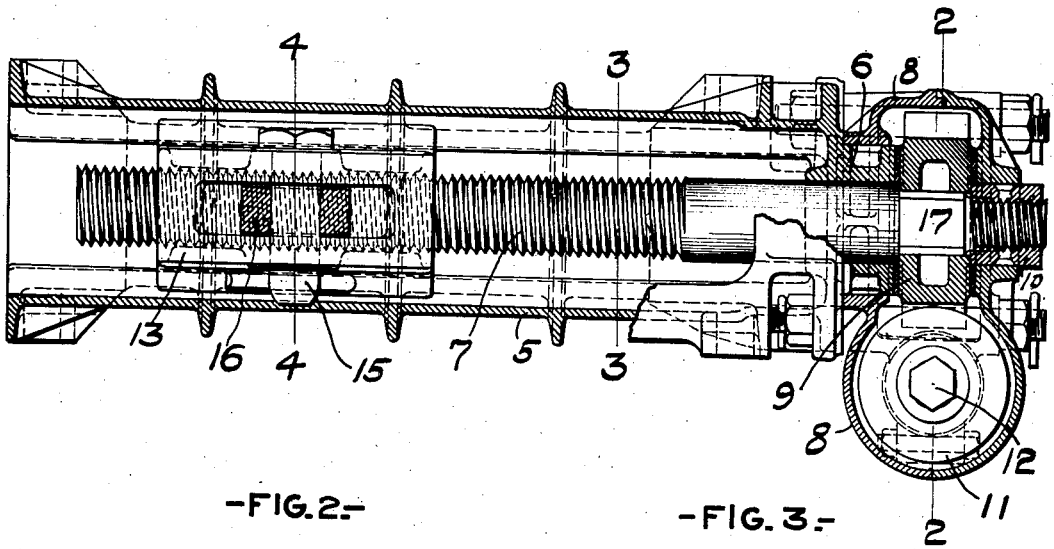
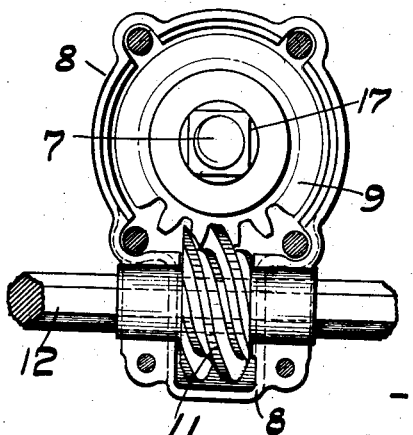
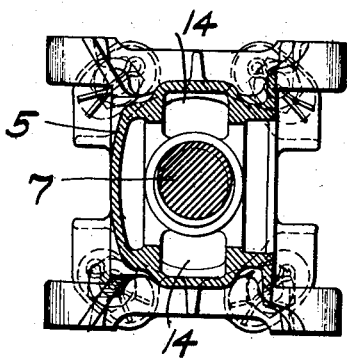
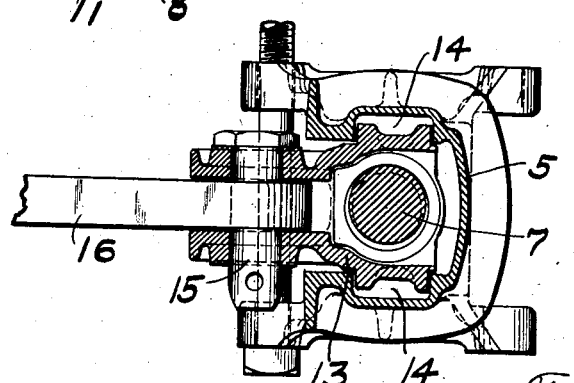
INVENTOR
Francis E. Schwentler
by Edward H. Wright
Atty.

UNITED STATES PATENT OFFICE.

FRANCIS E. SCHWENTLER, OF ST. LOUIS, MISSOURI, ASSIGNOR TO THE AMERICAN BRAKE COMPANY, OF ST. LOUIS, MISSOURI, A CORPORATION OF MISSOURI.

MANUALLY-OPERATED SLACK-ADJUSTER.

1,328,341.     Specification of Letters Patent.     Patented Jan. 20, 1920.

Application filed September 30, 1916. Serial No. 122,994.

*To all whom it may concern:*

Be it known that I, FRANCIS E. SCHWENTLER, a citizen of the United States, residing at St. Louis, in the State of Missouri, have invented a certain new and useful Improvement in Manually-Operated Slack-Adjusters, of which improvement the following is a specification.

This invention relates to slack adjusters for brake rigging, and has for its object to provide an improved device of a simple, compact, and durable construction, in which the adjuster screw is adapted to be manually operated from the side of the car, thereby rendering it possible to take up the slack without exposing the men to danger in working under the car.

In the accompanying drawing: Figure 1 is a vertical longitudinal section of a slack adjuster embodying my improvement; Fig. 2, a transverse section taken on the line 2—2 of Fig. 1; Fig. 3, a transverse section taken on the line 3—3 of Fig. 1; and Fig. 4, a transverse section taken on the line 4—4 of Fig. 1.

According to the construction shown, the preferred form of the improvement comprises an adjuster casing or body, 5, containing the adjuster screw, 7, on which is mounted the cross head or fulcrum block, 13, having lugs fitting within the guide channels, 14, for guiding the block as the same slides longitudinally within the casing. The block, 13, is also provided with a projection extending laterally through a slot in the side of the adjuster casing, for carrying the fulcrum pin, 15, on which the lever, 16, of the brake rigging is pivoted.

The adjuster casing, 5, is provided at one end with a hub portion, 6, within which is the cylindrical bearing for the screw, and on the outside of the hub is fitted the gear housing, 8, which may be secured to the adjuster casing by bolts at the four corners, as shown. The stem of the screw, which is reduced or shouldered at the end of the bearing in the hub, 6, is formed with a square or other non-circular section at 17, for receiving the gear wheel, 9, and is also threaded at its end for the reception of the nut, 10, which has a cylindrical outer surface, and forms another bearing for the screw in the outer wall of the gear housing, 8. The gear, 9, is thus fitted between the outer wall of the housing and the end of the hub portion, 6, and prevents longitudinal movement of the screw in the casing.

The transverse shaft, 12, is mounted in bearings in the gear housing, 8, and carries the spiral gear or worm wheel, 11, meshing with the gear, 9, within the housing. The transverse shaft may also extend to one or both sides of the car, and be provided with suitable means, such as a wrench or hand wheel, for manually operating the same.

The adjuster casing is provided with bolting lugs at the top and bottom, making it convenient for application for either right or left hand operation, and the gear housing, 8, may be adjusted on the hub portion in different quadrants, if desired, for the purpose of carrying the transverse shaft above or below the adjuster screw to clear brake rods or other obstructions on the car.

When it is desired to adjust the device for the purpose of taking up the slack in the brake rigging due to the wear of the brake shoes, or when new shoes are to be inserted, the shaft, 12, may be readily turned by suitable means at the side of the car, and, through the action of the gears, 11 and 9, the screw will be operated to adjust the fulcrum block and lever to the desired position.

Having now described my invention, what I claim as new and desire to secure by Letters Patent is:

1. In a slack adjuster, the combination of a casing having a hub portion at one end, a screw rotatably mounted in said casing and having a bearing in the hub portion, a gear housing secured to the hub portion of the casing, a gear wheel fixed on said screw and fitted between the hub portion of the casing and the outer wall of the gear housing for preventing longitudinal movement of the screw, and means for operating said gear wheel.

2. In a slack adjuster, the combination of a casing, a screw rotatably mounted in the casing and having a bearing at one end thereof, a gear housing secured to the end of the casing outside of said bearing, a gear wheel mounted on the stem of the screw within the housing, a cylindrical nut at the end of the screw stem and having a bearing in the outer wall of the housing, and means for operating said gear wheel.

3. In a slack adjuster, the combination of a casing, a screw rotatably mounted in said casing and having a bearing in one end thereof, a gear housing secured at the end of said casing, a gear wheel mounted on the stem of said screw outside of said casing and within the housing, a nut on said stem for holding the gear wheel, and a bearing at the outer end of the stem of said screw in the wall of said housing.

4. In a slack adjuster, the combination of a casing having a hub portion and a bearing at one end, a screw rotatably mounted in said bearing, a gear housing secured to the end of the casing, a gear wheel mounted on the stem of the screw and fitted between the hub portion and the outer wall of the housing, a manually operated shaft extending transversely from the housing, and a worm mounted on said shaft and engaging the gear wheel within the housing.

In testimony whereof I have hereunto set my hand.

FRANCIS E. SCHWENTLER.